US008786618B2

(12) United States Patent
Duluk, Jr. et al.

(10) Patent No.: US 8,786,618 B2
(45) Date of Patent: Jul. 22, 2014

(54) SHADER PROGRAM HEADERS

(75) Inventors: Jerome F. Duluk, Jr., Palo Alto, CA (US); Jesse David Hall, Santa Clara, CA (US); Patrick R. Brown, Wake Forest, NC (US); Gernot Schaufler, Mountain View, CA (US); Mark D. Stadler, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 361 days.

(21) Appl. No.: 12/899,431

(22) Filed: Oct. 6, 2010

(65) Prior Publication Data

US 2011/0084976 A1 Apr. 14, 2011

Related U.S. Application Data

(60) Provisional application No. 61/249,919, filed on Oct. 8, 2009.

(51) Int. Cl.
*G06T 1/00* (2006.01)
(52) U.S. Cl.
USPC ......................................................... 345/522
(58) Field of Classification Search
None
See application file for complete search history.

(56) References Cited

U.S. PATENT DOCUMENTS

| 6,819,325 | B2 * | 11/2004 | Boyd et al. ............... 345/559 |
| 7,015,909 | B1 * | 3/2006 | Morgan, III et al. ...... 345/426 |
| 7,450,131 | B2 * | 11/2008 | Swamy et al. ............. 345/565 |
| 7,800,606 | B2 * | 9/2010 | Boyd et al. ............... 345/418 |
| 8,111,260 | B2 * | 2/2012 | Srinivasan et al. ........ 345/543 |
| 8,120,608 | B2 * | 2/2012 | Jiao et al. ................. 345/426 |
| 2004/0169671 | A1 * | 9/2004 | Aronson et al. ........... 345/700 |
| 2009/0046103 | A1 * | 2/2009 | Bergland et al. .......... 345/506 |

OTHER PUBLICATIONS

Jones, Wendy, Begining DirectX Game Programming, Course Technology, 2007, pp. 176-184.*

* cited by examiner

*Primary Examiner* — Hau Nguyen
*Assistant Examiner* — Ryan M Gray
(74) *Attorney, Agent, or Firm* — Patterson & Sheridan, LLP (57) ABSTRACT

One embodiment of the present invention sets forth a technique for configuring a graphics processing pipeline (GPP) to process data according to one or more shader programs. The method includes receiving a plurality of pointers, where each pointer references a different shader program header (SPH) included in a plurality of SPHs, and each SPH is associated with a different shader program that executes within the GPP. For each SPH included in the plurality of SPHs, one or more GPP configuration parameters included in the SPH are identified, and the GPP is adjusted based on the one or more GPP configuration parameters.

22 Claims, 8 Drawing Sheets

SHADER PROGRAM HEADERS

CROSS-REFERENCE TO RELATED APPLICATIONS

This application claims priority benefit to U.S. provisional patent application titled, "SHADER PROGRAM HEADERS" filed on Oct. 8, 2009 and having Ser. No. 61/249,919.

BACKGROUND OF THE INVENTION

1. Field of the Invention

The present invention generally relates to computer graphics and more particularly to a method and system for configuring a graphics processing unit (GPU).

2. Description of the Related Art

Over the past decade, graphics hardware has gone from a simple memory device to a configurable device and relatively recently, to a GPU. In a prior art approach, a GPU includes a series of processing units, each is configured to carry out a different and often dedicated function of a graphics pipeline, where the output of one processing unit is the input to the next processing unit in the chain. Some of these processing units in the graphics pipeline are programmable, such as a vertex processing unit and a fragment processing unit, but other processing units perform fixed functions, such as a primitive assembler, a geometry processor, and a rasterizer.

When using programmable processing units, applications provide a collection of shaders, which are programs executed on these units. The device driver managing such hardware typically must not only compile and enable such shaders, but must also configure other pipeline units based on properties of the active shaders. In one example, a device driver must configure depth testing to be performed after pixel shader execution when using a pixel shader that writes a depth value. In another example, a device driver for hardware capable of executing multiple shaders concurrently may need to partition a fixed-size memory available for temporary storage during shader execution based on the memory requirements of multiple active shaders.

In prior art systems, device drivers processing a new shader will typically send a sequence of commands to the graphics hardware. This sequence will not only specify and enable the shader code, but it will also configure other units of the graphics hardware whose operation depends on properties of the shader. This sequence of commands will be sent not only when the shader is first used, but also repeatedly when switching among a collection of different shaders—a typical behavior for graphics applications. This repeated re-configuration consumes significant processing and memory resources and introduces undesirable delays. Additionally, as noted above, some hardware state needs to be configured based on the properties of multiple shaders. For this sort of state, re-configuration is required when any shader is changed, and the processing and memory resource overhead is even more pronounced because it requires analyzing the state of multiple shaders at once.

As the foregoing illustrates, what is needed in the art is a more efficient method and system for configuring a graphics pipeline for execution.

SUMMARY OF THE INVENTION

One embodiment of the present invention sets forth a technique for configuring a graphics processing pipeline (GPP) to process data according to one or more shader programs. The method includes receiving a plurality of pointers, where each pointer references a different shader program header (SPH) included in a plurality of SPHs, and each SPH is associated with a different shader program that executes within the GPP. For each SPH included in the plurality of SPHs, one or more GPP configuration parameters included in the SPH are identified, and the GPP is adjusted based on the one or more GPP configuration parameters.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
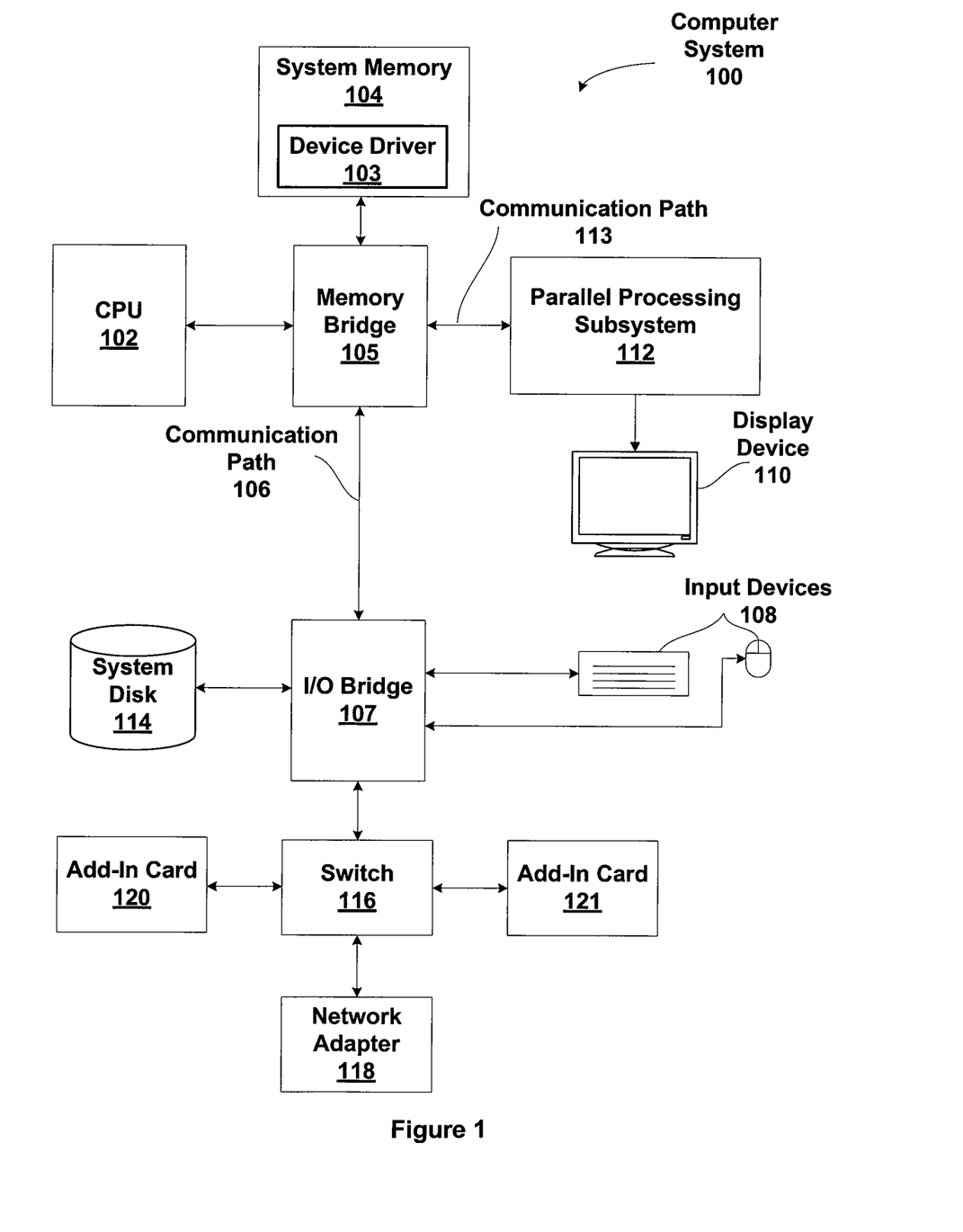
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
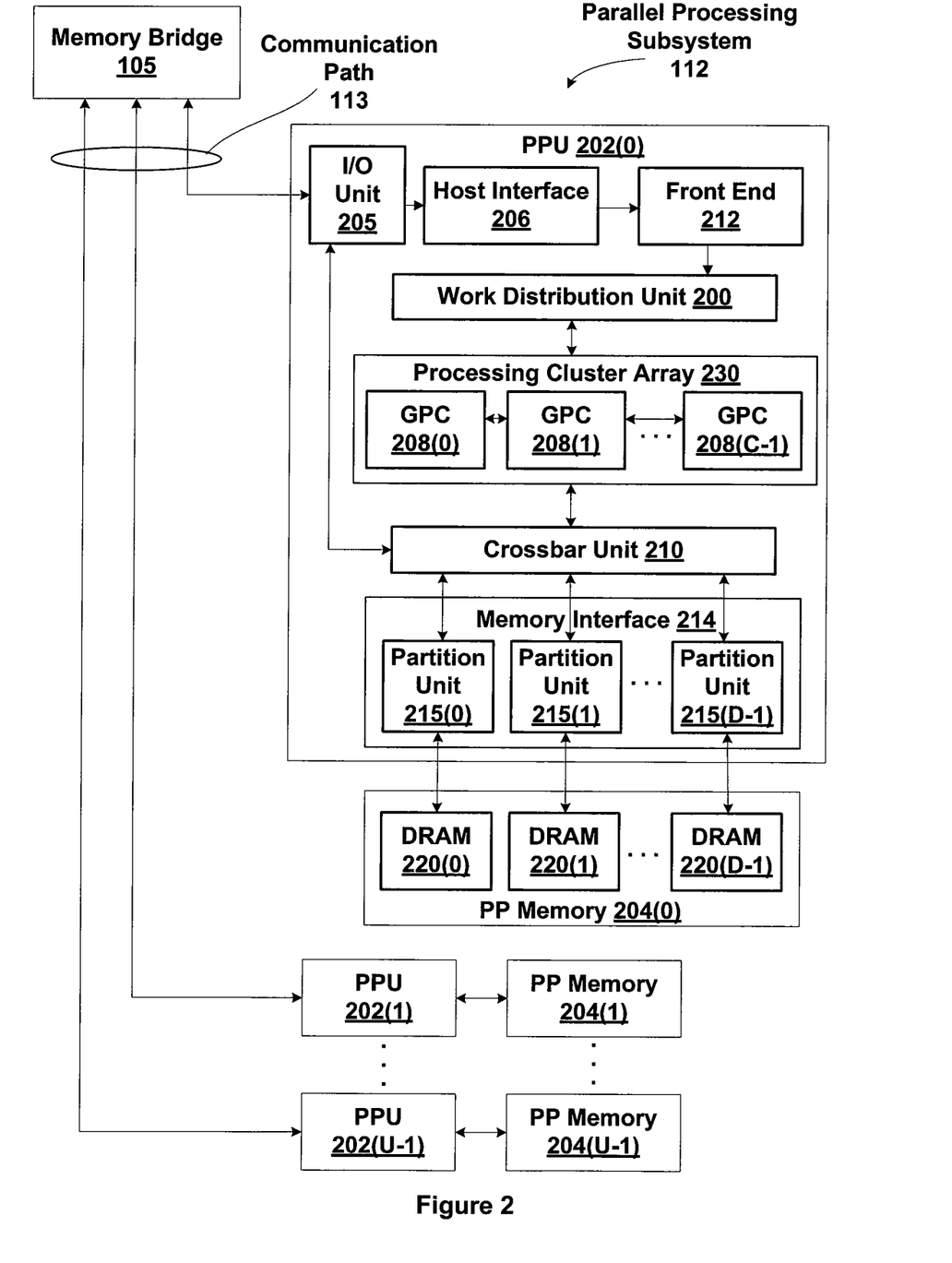
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
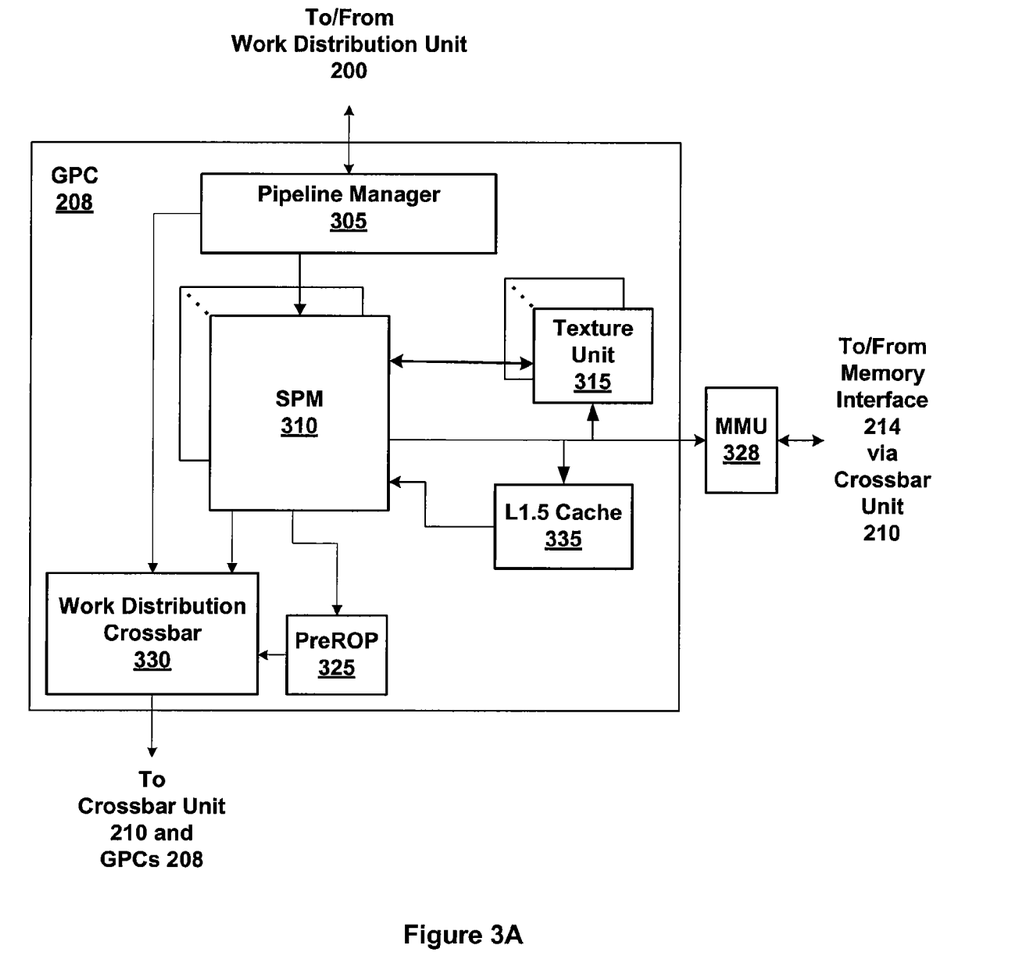
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed.

Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
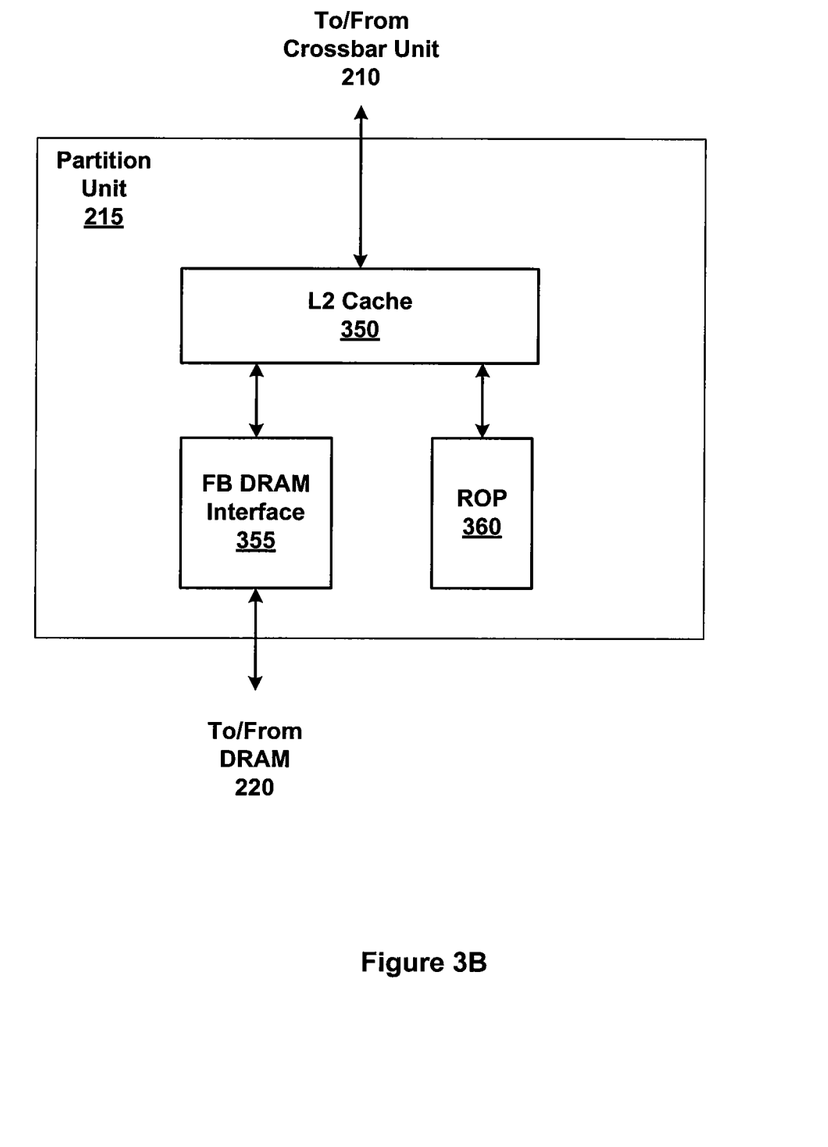
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of the thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
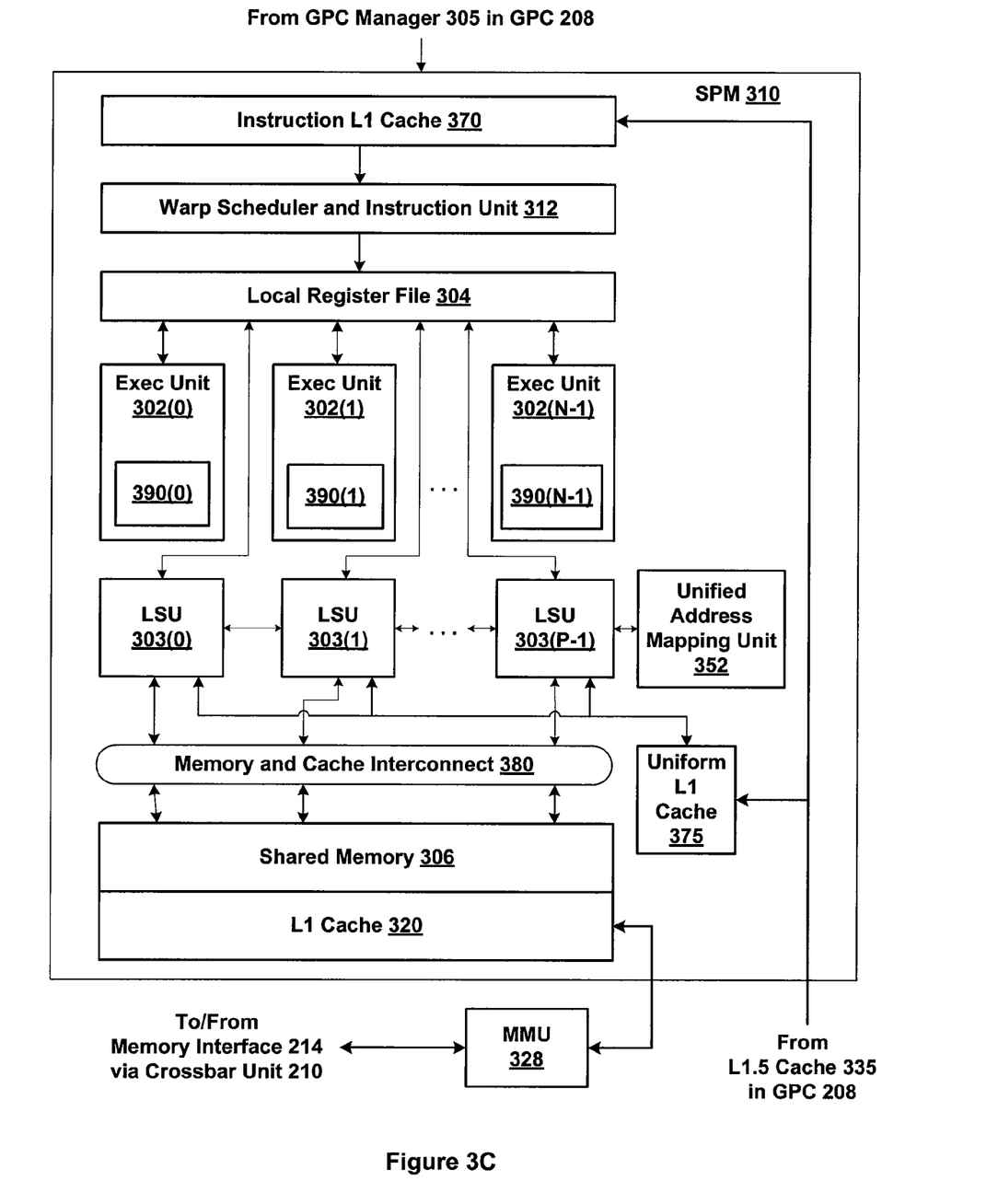
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Figure 4A:
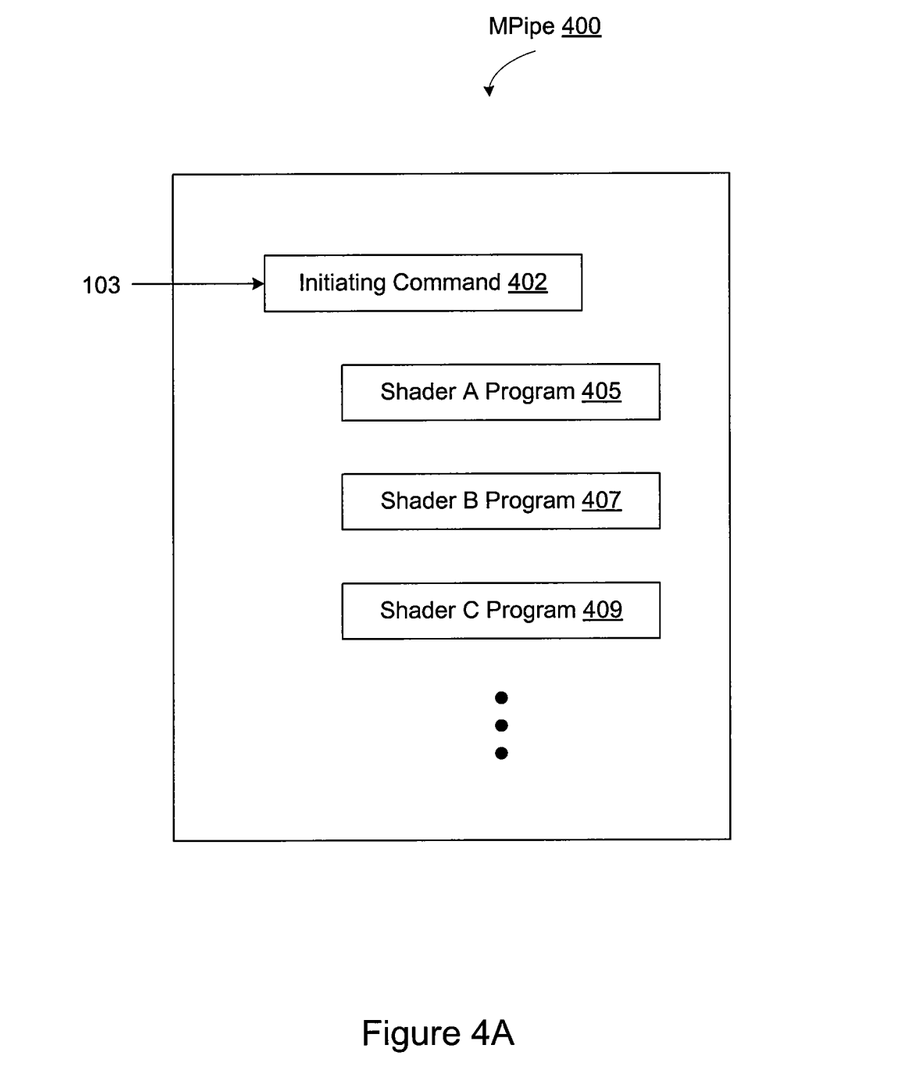
FIG. 4A is a conceptual diagram of a generic modular pipe (MPipe), according to one embodiment of the invention.

FIG. 4A is a conceptual diagram of a modular pipe (MPipe) 400 configured to execute within an SPM 310, according to one embodiment of the invention. As shown, MPipe 400 includes a set of shaders, such as shader A program 405, shader B program 407, and shader C program 409. An initiating command 402 from device driver 103 triggers the creation of an instance of the MPipe. After all the shaders in the MPipe complete in execution, the instance of the MPipe is terminated. If termination of the instance is desired before the completion of execution of all the shaders, then one of the shader programs issues a kill command to stop further execution of this work packet. Upon receiving initiating command 402, SPM 310 creates an instance of MPipe 400 with the shaders configured in a user-defined sequence shown in FIG. 4A. SPM 310 executes these shaders serially to operate on a set of input data. The shaders can form a linear processing list, where shader A program 405 may receive input in the form of vertices, the output from shader A program 405 forms the input to shader B program 407, and the output from shader B program 407 forms the input to shader C program 409. In an alternative configuration, the output from shader A program 405 forms the input for both shader B program 407 and shader C program 409 in a tree-like arrangement. It should be noted that the connectivity among the shaders is configurable, and the configuration for MPipe 400 can be any type of directed graph. Also, MPipe 400 also supports replicating any shader within the MPipe. For instance, although vertex processing occurs prior to geometry processing in a traditional graphics pipeline, MPipe 400 may be configured to have a vertex shader after a geometry shader. Also, instead of performing vertex processing once in a single pass through the traditional graphics pipeline, MPipe 400 may be configured to have multiple, successive vertex shaders. In addition, each of the shaders can be of a different type. For example, in one implementation, shader A program 405 is a vertex shader, shader B program 407 is a tessellation shader, and shader C program 409 is a geometry shader. Such an MPipe is referred to as a geometry MPipe. In another implementation, however, all the shaders in MPipe 400 are of the same type, such as vertex shaders.

To identify the various shaders that are loaded in a memory system, one embodiment of MPipe 400 utilizes an MPipe table. It should be apparent to a person with ordinary skill in the art to recognize that this memory system can be any memory system that is accessible by parallel processing subsystem 112 shown in FIG. 1.

Figure 4B:
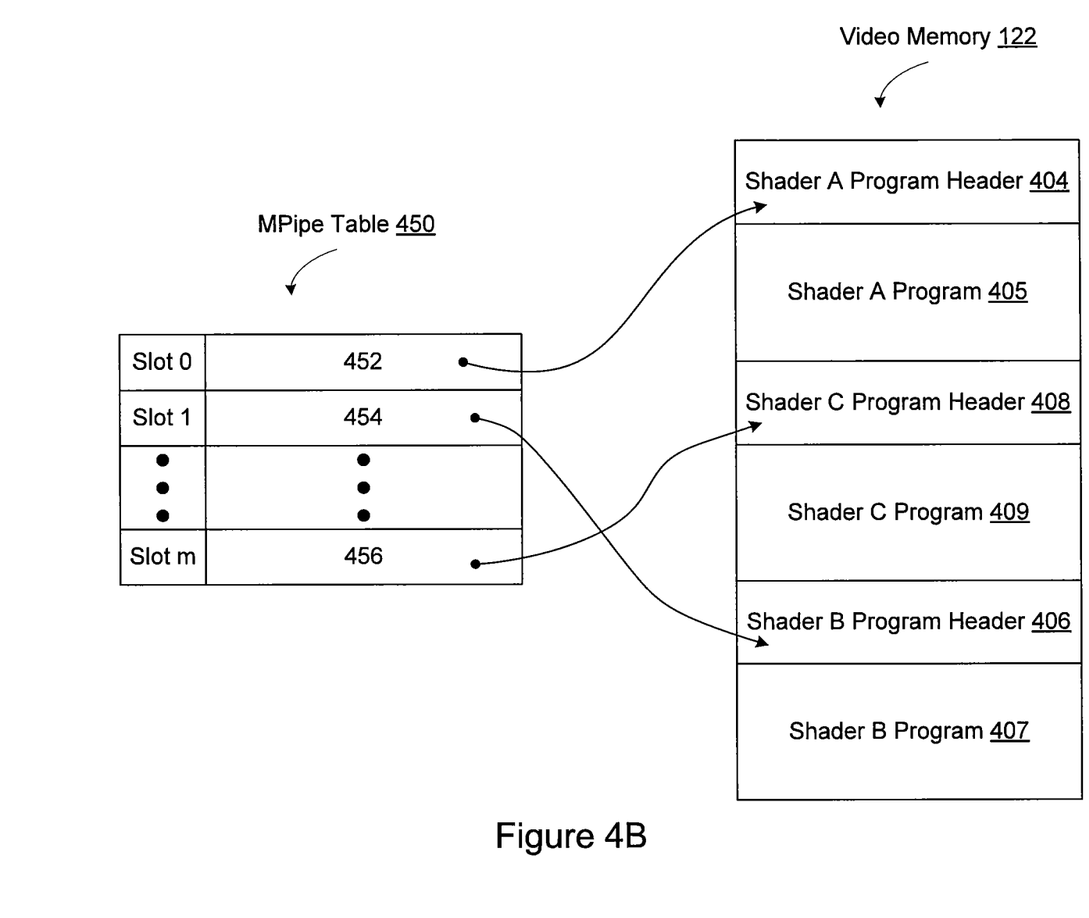
FIG. 4B is a simplified diagram of an MPipe table, according to one embodiment of the invention.

FIG. 4B is a simplified diagram of an MPipe table 450, according to one embodiment of the invention. MPipe table 450 includes a number m of slots, each containing a pointer pointing to a block of memory locations that store shader program headers (SPHs), where each SPH is associated with one or more programming instructions that comprise a shader in MPipe 400. In particular, slot 0 of MPipe table 450 contains a pointer 452, which points to a SPH A 404 that is associated with shader A program 405 described above in FIG. 4A. Similarly, slot 1 and slot m contain pointers 454 and 456, which point to SPH B 406 and SPH C 408, respectively. As shown, MPipe table 450 is not required to use contiguous slots to store the pointers. So, instead of storing pointer 456 in slot 2, pointer 456 is stored in slot m (suppose m>2 in this example). In one implementation, each slot of MPipe table 450 is associated with an "enable" bit. If the enable bit for a slot, such as slot 0, is set to 1 (TRUE), then the content of slot 0 is retrieved. More specifically, the configuration for slot 0 and the program for slot 0 are read from memory and the MPipe stage is configured to a state in which work packets can be received and processed. On the other hand, if the enable bit for a slot, such as slot 2, is set to 0 (FALSE), then slot 2 is skipped.

Each of SPHs 404, 406, and 408 include information that the pipeline manager 305 interprets to appropriately configure MPipe 400. In one embodiment, an SPH includes one or more fields that each define MPipe 400 configuration parameters. For example, SPH 404 may indicate a maximum amount of local memory that is required to execute individual threads of the associated shader A program 405. The pipeline manager 305 may also aggregate each of SPHs 404, 406, and 408 to determine any adjustments that should be globally applied to MPipe 400. For example, the pipeline manager 305 may parse a plurality of SPHs to determine which SPH indicates the largest amount of memory that is required to execute the associated shader. The pipeline manager 305 may then divide a total size of available global memory by the largest amount of required global memory that is indicated in the SPHs to determine a total number of warps that are able to be concurrently executed within the MPipe 400.

Based on commands from a graphics application, MPipe table 450 is configured with appropriate pointers pointing to the memory locations containing the SPHs of shaders that the graphics application intends to execute. With the configured MPipe table 450 and the shaders already loaded in memory, warp scheduler and instruction unit 312 waits for an external event to trigger the operations of MPipe 400. One external event is the arrival of a packet of work at the head of MPipe 400. This external event along with the traversal of the packet through MPipe 400 defines an instance of the MPipe. Each SM is capable of executing multiple instances of an MPipe concurrently to operate on multiple streams of work.

Other embodiments of this invention may not provide an MPipe system as flexible as the one described in the previous language FIGS. 4A and 4B. In another embodiment, the MPipe 400 may provide a set of discrete shader stages, each of which can have at most one shader program bound. Such embodiments may also have a fixed topology, where the shaders bound to each stage are executed in a fixed sequence. In one common embodiment, an MPipe 400 would have a vertex shader, a tessellation initialization shader (also known as a tessellation control or hull shader), a tessellation shader (also known as a tessellation evaluation or domain shader), a geometry shader, and a pixel shader, with shaders executed in that sequence.

The shader header of a shader may include, but is not limited to the following information: (a) the type of the shader, such as, without limitation, a vertex shader, a tessellation initialization shader, a tessellation shader, a geometry shader, or a pixel shader; (b) the amount of memory that is required for execution; (c) the output primitive type, such as, a point, a line, a triangle, a line strip, a triangle strip, lines with adjacency, or triangles with adjacency; (d) the maximum number of vertices output by the shader, and (e) an input map and an output map the specify vertex attributes that are required as input to the shader and output from the shader, respectively.

Referring back to FIG. 4A and FIG. 4B, suppose shader A 404 includes a shader header as well as executable code. In one implementation, the shader header is of the same fixed size for all shaders in MPipe 400, and pointer 452 points to a program header for shader A 404 and with the executable code of shader A 404 residing at a fixed offset from pointer 452. Alternatively, the shader header of shader A 404 includes a pointer or a relative offset to the executable code of shader A 404. In another implementation, MPipe table 450 shown in FIG. 4B contains separate pointers to the shader header and the executable code for the shaders. Additional fields that are included in the SPHs and are interpretable by the pipeline manager 305 are described in detail below.

The SPH field "SphType" specifies the type of shader with which the SPH is associated, where the type is either a first type that may be any of a vertex, a tessellation, or a geometry shader (VTG Shaders), or a second type that is a pixel shader (PS). In one embodiment, the "SphType" field controls the interpretation of subsequent bits. In particular, the map of active inputs for a pixel shader is substantially different than that for VTG shaders, since multiple bits per input are required to specify how the pixel shader inputs are to be interpolated.

The SPH field "Version" specifies a particular version of the SPH header. The Version field may be represented by a numerical value, such as "1.0," where the numerical value indicates, for example, the format of the SPH so that the pipeline manager 305 may properly interpret the fields included in the SPH. The "Version" field permits embodiments to support and identify multiple different versions of a shader. The SPM 310 in such an embodiment might accept shaders compiled for the SPM 310 of older-generation GPUs without modification.

The SPH field "ShaderType" acts as a subtype to the Sph-Type field and specifies the shader to which the SPH refers, such as a vertex, tessellation, geometry, or pixel shader.

The SPH field "KillsPixels," if set as TRUE, enables pixel shaders to "kill" (discard) pixels during processing. When set to FALSE, any pixel shader kill instructions (denoted "KIL") become "no-operations" (not executed). Also, when this field is set as TRUE, Early-Z mode, as known to those having ordinary skill in the art, is automatically deactivated. This particular SPH field is only used by pixel shaders.

The SPH field "DoesGlobalStore" indicates that the associated shader may perform a global store operation. When DoesGlobalStore is FALSE, any global store instructions become no-operations. However, a store local instruction (denoted "ST") may still be referenced by the associated shader when performing local, non-global store operations. This field also affects the ability to use Early-Z mode, since killing pixels before running the pixel shader would cause any global stores that would be executed by the pixel shader to be skipped.

The SPH field "StreamOutMask" selects which geometry shader output streams are enabled as outputs from the associated geometry shader. In one embodiment, there are four geometry shader output streams numbered from 0-3, respectively. If a particular stream is disabled by the StreamOutMask, the stream is never written.

The SPH field "ShaderLocalMemoryLowSize" specifies the required size of thread-private memory, for variable storage, needed by the associated shader. Similarly, the SPH field "ShaderLocalMemoryHighSize" specifies the required size of a thread-private data stack that is required to execute the associated shader.

The SPH field "ThreadsPerinputPrimitive" sets the maximum number of threads that are invoked for a primitive, thereby allowing the work of one shader to be divided across several threads. More specifically, this is the number of "instanced" shaders. With respect to a tessellation initialization stage, this field specifies the number of threads that are executed per patch. With respect to the geometry stage, this field specifies the number of threads that are run per primitive.

The SPH field "ShaderLocalMemoryCrsSize" specifies an additional, off-GPU call/return stack size, where the ShaderLocalMemoryCrsSize field is specified in units of Bytes/Warp. In one embodiment, a minimum value of 0, and a maximum value of one megabyte may be specified, where the value is a multiple of 512 bytes.

The SPH field "OutputTopology" sets the primitive topology of the vertices that are output from the MPipe 400. For a geometry shader, this field may be specified as a point list primitive, a line strip primitive, or a triangle strip primitive, as known to those having skill in the art.

The SPH field "MaxOutputVertexCount" sets the maximum number of vertices that can be output by one shader thread and may only be specified by a geometry shader. In one embodiment, the value must be greater than zero and has a maximum value of 1024. This field indicates the maximum amount of memory the pipeline manager 305 needs to reserve to hold the outputs of each geometry shader invocation processed by the MPipe 400.

The SPH field "DoesLoadOrStore" is used to enable power optimizations by disabling a load/store path. In one embodiment, if a shader is only executing pixel work and the SPH field DoesLoadOrStore is set as FALSE, and it has declared no additional call/return stack (by setting the SPH field ShaderLocalMemoryCrsSize as zero), then the load/store path can be safely shut down temporarily. In other embodiments not using the load/store path for processing vertex attributes, the path might be safely shut down even when processing non-pixel shaders.

The SPH field "DoesFp64" is used to disable a processing engine that performs double precision math executions, thereby reducing power consumption. In one embodiment, pipeline manager 305 examines the "DoesFp64" field for all active SPHs in the MPipe 400 and will disable the double precision math engine only if the field is set to FALSE in all shaders.

The SPH field "PerPatchAttributeCount" indicates the number of per-patch attributes that are written by a tessellation initialization shader or read by a tessellation shader. Per-patch attributes are in addition to per-vertex attributes. This field indicates the amount of memory the pipeline manager 305 needs to reserve to hold the per-patch attributes of each patch processed by the MPipe 400.

The SPH fields "ImapSystemValuesA", "ImapSystemValuesB", "ImapGenericVector", "ImapColor", "ImapSystemValuesC", and "ImapFixedFncTexture" for pixel shaders indicate interpolation properties of each input that may be accessed by the pixel shader. As is well-known to those skilled in the art, the rasterizer unit of a GPU will determine both the set of pixels covered by point, line, and triangle primitives and the values of pixel shader inputs at each of these pixels. The values for pixel shader inputs are commonly computed by a process known as interpolation. When performing interpolation, the GPU will typically compute a weighted average of corresponding attributes of the vertices of the primitive with weights based on the position of each pixel relative to the vertices. In one embodiment, these SPH interpolation properties are used to control to interpolation on a single pixel shader input with possible values of "UNUSED", "CONSTANT", "PERSPECTIVE", or "SCREEN_LINEAR". "CONSTANT" indicates that a single value should be used for all pixels, typically obtained from one of the primitive vertices. "PERSPECTIVE" and "SCREEN_LINEAR" indicate that interpolation weights should be derived with or without perspective correction, respectively. Perspective correction accounts for the fact that "distant" pixels cover more of the original primitive than "near" ones. "UNUSED" indicates that input is not used by the shader, and may be used to reduce the amount of interpolation work performed. In another embodiment, a single SPH interpolation property may control interpolation of a plurality of input values (e.g., all components of a multi-component vector).

These SPH fields described herein are examples of fields that may be included in an SPH, according to embodiments of the invention. The embodiments, however, are not limited to only these fields, and the SPH may be modified to include any conceivable fields that are directed to configure the MPipe 400.

Figure 5:
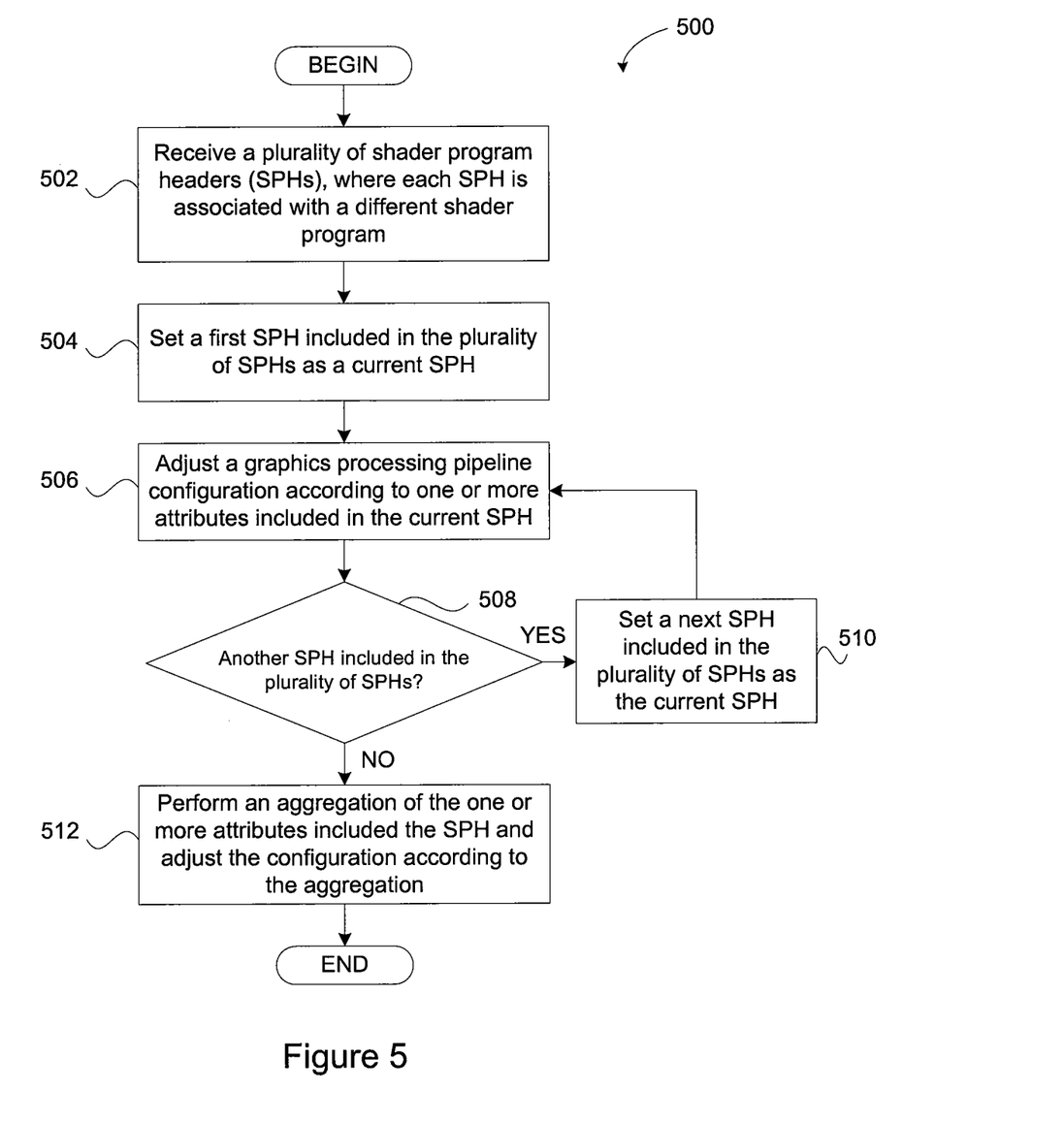
FIG. 5 is a flow diagram of method steps for configuring an MPipe based on one or more shader program headers (SPHs), according to one embodiment of the present invention.

FIG. 5 is a flow diagram of method steps 500 for configuring an MPipe based on one or more SPHs, according to one embodiment of the present invention. Although the method steps are described in conjunction with the systems of FIGS. 1-4, persons skilled in the art will understand that any system configured to perform the method steps, in any order, is within the scope of the inventions.

The method 500 begins at step 502, where pipeline manager 305 receives a plurality of shader program header (SPHs) that are each associated a different shader program.

At step 504, pipeline manager 305 sets a first SPH included in the plurality of SPHs as a current SPH. At step 506, pipeline manager 305 adjusts a graphics processing pipeline configuration according to one or more attributes included in the current SPH.

At step 508, pipeline manager 305 determines whether another SPH is included in the plurality of SPHs. If, at step 508, pipeline manager 305 determines that another SPH is included in the plurality of SPHs, then the method 500 proceeds to step 510. At step 510, pipeline manager 305 sets a next SPH included in the plurality of SPHs as the current SPH, and step 506 is repeated as described above. The steps 506-510 repeat until each SPH included in the SPH is processed.

Referring back now to step 508, if the pipeline manager 305 determines that no additional SPHs are included in the plurality of SPHs, then the method 500 proceeds to step 512. At step 512, pipeline manager 305 performs an aggregation of the one or more attributes included the SPH and adjusts the configuration according to the aggregation.

The above description illustrates various embodiments of the invention along with examples of how aspects of the invention may be implemented. The above examples, embodiments, instruction semantics, and drawings should not be deemed to be the only embodiments, and are presented to illustrate the flexibility and advantages of the invention as defined by the following claims.

We claim:

1. A computer-implemented method for configuring a graphics processing pipeline (GPP) to process data according to one or more shader programs, the method comprising:
    receiving a plurality of pointers, wherein each pointer references a different shader program header (SPH) included in a plurality of SPHs, and each SPH is stored with a different associated shader program that executes within the GPP; and
    for each SPH included in the plurality of SPHs:
        identifying one or more GPP configuration parameters included in the SPH; and
        adjusting the GPP based on the one or more GPP configuration parameters.

2. The method of claim 1, further comprising the steps of aggregating each of the one or more GPP configuration parameters to generate one or more global GPP configuration parameters, and adjusting the GPP based on the one or more global GPP configuration parameters.

3. The method of claim 1, wherein each SPH indicates an offset that locates a set of instructions that comprise the shader program associated with the SPH.

4. The method of claim 1, wherein each SPH indicates an amount of local memory that is required to execute the shader program associated with the SPH.

5. The method of claim 1, wherein each SPH indicates whether the shader program associated with the SPH is able to execute load and store operations to a global memory that is accessible by all of the shader programs that execute within the GPP.

6. The method of claim 5, wherein, if an SPH indicates that the shader program associated with the SPH is able to execute load and store operations to the global memory, then the GPP does not perform an early depth-based discard of pixels before the pixel shader is executed.

7. The method of claim 1, wherein, if an SPH is associated with a pixel shader program, then the SPH indicates whether the pixel shader program is able to discard pixels.

8. The method of claim 1, wherein, if an SPH is associated with a pixel shader program, then the SPH indicates for each of a plurality of possible shader inputs:
    whether the input is needed by the pixel shader; and
    how the input should be interpolated when pixel shader input values are constructed by the GPP.

9. The method of claim 1, wherein a plurality of SPH formats is supported, and each SPH provides version information indicating how the one or more configuration parameters included in the SPH are identified.

10. The method of claim 1, wherein each SPH is stored in a first portion of a block of memory in which an associated shader program also is stored.

11. The method of claim 1, wherein each SPH is stored in a memory location that is contiguous with a memory location at which an associated shader program is stored.

12. A non-transitory computer-readable storage medium storing instructions that, when executed by a processor, cause a computing device to configure a graphics processing pipeline (GPP) to process data according to one or more shader programs, by performing the steps of:
    receiving a plurality of pointers, wherein each pointer references a different shader program header (SPH) included in a plurality of SPHs, and each SPH is stored with a different associated shader program that executes within the GPP; and
    for each SPH included in the plurality of SPHs:
        identifying one or more GPP configuration parameters included in the SPH; and
        adjusting the GPP based on the one or more GPP configuration parameters.

13. The non-transitory computer-readable storage medium of claim 12, further comprising the steps of aggregating each of the one or more GPP configuration parameters to generate one or more global GPP configuration parameters, and adjusting the GPP based on the one or more global GPP configuration parameters.

14. The non-transitory computer-readable storage medium of claim 12, wherein each SPH indicates an offset that locates a set of instructions that comprise the shader program associated with the SPH.

15. The non-transitory computer-readable storage medium of claim 12, wherein each SPH indicates an amount of local memory that is required to execute the shader program associated with the SPH.

16. The non-transitory computer-readable storage medium of claim 12, wherein each SPH indicates whether the shader program associated with the SPH is able to execute load and store operations to a global memory that is accessible by all of the shader programs that execute within the GPP.

17. The non-transitory computer-readable storage medium of claim 16, wherein, if an SPH indicates that the shader program associated with the SPH is able to execute load and store operations to the global memory, then the GPP does not perform an early depth-based discard of pixels before the pixel shader is executed.

18. The non-transitory computer-readable storage medium of claim 12, wherein, if an SPH is associated with a pixel shader program, then the SPH indicates whether the pixel shader program is able to discard pixels.

19. The non-transitory computer-readable storage medium of claim 12, wherein, if an SPH is associated with a pixel shader program, then the SPH indicates for each of a plurality of possible shader inputs:
   whether the input is needed by the pixel shader; and
   how the input should be interpolated when pixel shader input values are constructed by the GPP.

20. The non-transitory computer-readable storage medium of claim 12, wherein a plurality of SPH formats is supported, and each SPH provides version information indicating how the one or more configuration parameters included in the SPH are identified.

21. A computing device that configures a graphics processing pipeline (GPP) to process data according to one or more shader programs, the computing device comprising:
   a host processor coupled to a main memory; and
   a graphics adapter having management unit, wherein the management unit is configured to:
      receive a plurality of pointers, wherein each pointer references a different shader program header (SPH) included in a plurality of SPHs, and each SPH is stored with a different associated shader program that executes within the GPP; and
      for each SPH included in the plurality of SPHs:
         identify one or more GPP configuration parameters included in the SPH; and
         adjust the GPP based on the one or more GPP configuration parameters.

22. The computing device of claim 21, wherein the management unit is further configured to aggregate each of the one or more GPP configuration parameters to generate one or more global GPP configuration parameters, and adjust the GPP based on the one or more global GPP configuration parameters.

* * * * *